United States Patent [19]

Eslinger et al.

[11] Patent Number: 4,652,216
[45] Date of Patent: Mar. 24, 1987

[54] COMPRESSOR INLET CONTROL DEVICE

[75] Inventors: Ralph G. Eslinger, Elyria; Brian C. Deem, Avon Lake; Gregory R. Fedor, Bay Village, all of Ohio

[73] Assignee: Allied Corporation, Morristown, N.J.

[21] Appl. No.: 612,283

[22] Filed: May 21, 1984

[51] Int. Cl.⁴ .................. F04B 49/08; F04B 41/06
[52] U.S. Cl. .................. 417/252; 417/295; 417/364; 137/494
[58] Field of Search .................. 417/252, 286–288, 417/295, 309, 364, 380; 137/494

[56] References Cited

U.S. PATENT DOCUMENTS

| | | |
|---|---|---|
| 683,388 | 9/1901 | Curtis . |
| 1,378,028 | 5/1921 | Hart .................. 417/252 |
| 1,508,707 | 9/1924 | Moss . |
| 1,826,638 | 10/1931 | Schwerdtfeger . |
| 2,233,307 | 2/1941 | Dodson .................. 123/119 |
| 2,305,070 | 12/1942 | Butler et al. .................. 123/119 |
| 2,772,828 | 12/1956 | Bush .................. 417/252 X |
| 2,849,173 | 8/1958 | Surdy .................. 417/380 X |
| 2,873,574 | 2/1959 | Webb .................. 417/380 X |
| 3,204,859 | 9/1965 | Crooks .................. 417/380 X |
| 3,249,145 | 5/1966 | Alberani et al. .................. 158/36.5 |
| 3,495,607 | 2/1970 | Shugarman .................. 137/81 |
| 3,522,818 | 8/1970 | Suchy .................. 137/494 |
| 4,005,579 | 2/1977 | Lloyd .................. 60/602 |
| 4,496,291 | 1/1985 | Grimmer .................. 417/364 X |

FOREIGN PATENT DOCUMENTS

| | | | |
|---|---|---|---|
| 1140287 | 7/1957 | France .................. | 417/252 |
| 1254163 | 1/1961 | France .................. | 417/364 |
| 456336 | 7/1926 | German Democratic Rep. .................. | 137/494 |
| 2023233 | 12/1979 | United Kingdom .................. | 364/ |

Primary Examiner—Carlton R. Croyle
Assistant Examiner—Theodore W. Olds
Attorney, Agent, or Firm—Ken C. Decker; William N. Antonis

[57] ABSTRACT

Compressor inlet control devices control the pressure level at the inlet of a compressor (18) which is operated by an engine (10) equipped with a turbocharger (12) that maintains the intake manifold (16) of the engine (10) at pressure levels greater than atmospheric for most engine operating conditions. A valve (20) limits the pressure level at the inlet of the compressor (18) to a predetermined pressure level to prevent damage to the compressor (18). The valve (20) includes a pressure differential responsive piston (36) which responds to the pressure level at the valve inlet (52) to close a pair of valve members (60,62) to terminate communication between the valve inlet (52) and outlet (54) when the pressure level at the inlet (52) exceeds the predetermined pressure level, and to initiate communication between the inlet (52) and outlet (54) when the pressure level drops below the predetermined pressure level.

3 Claims, 2 Drawing Figures

COMPRESSOR INLET CONTROL DEVICE

This invention relates to a compressor inlet control device which regulates the inlet pressure to an automotive air compressor.

Diesel engines of the type used in heavy duty trucks are commonly equipped with turbochargers, which use the exhaust gasses of the engine in order to compress atmospheric air to charge the intake manifold of the engine with air at above atmospheric pressure. Use of turbochargers increases the efficiency of the engine substantially. Although turbochargers are most commonly used with diesel engines used on heavy duty trucks, it is possible that other devices which mechanically increase the pressure level at the intake manifold of the engine, such as superchargers, may also be used. As used in this patent application, the term "turbochargers" should be construed to also mean superchargers and other devices for mechanically increasing the pressure level at the intake manifold of the engine.

Heavy duty vehicles of the type equipped with turbocharged diesel engines are also commonly provided with an engine-operated air compressor which compresses atmospheric air for use in, for example, the vehicle air brake system. Accordingly, the present invention pertains to a system including an air compressor powered by the vehicle engine having an intake manifold, a turbocharger to increase the pressure level in the intake manifold of the engine to pressure levels greater than atmospheric pressure, the turbocharger having an outlet communicated to the intake manifold, the air compressor having an inlet and an outlet, the air compressor inlet being communicated with the outlet of the turbocharger so that the air communicated into the inlet of the air compressor has been compressed by the turbocharger to a pressure level greater than atmospheric pressure and the air compressor raises the pressure level at the inlet of the air compressor to a still higher pressure level at the outlet thereof.

Using the output of the turbocharger as the inlet of the automotive air compressor has several advantages. Air compressors have a tendency to pass lubricating oil into the air being compressed. Using turbocharger air tends to reduce this passing of oil into the air being compressed. Furthermore, compressor inlet air must be filtered, and by communicating the air compressor with the air (which has already been filtered) at the output of the turbocharger eliminates a separate air filter which would otherwise be necessary. Furthermore, since the inlet air to the air compressor has already been compressed to a pressure level above atmospheric, the air delivery of the air compressor can be increased. However, use of the turbocharger air is beneficial only if the pressure level of the output of the turbocharger is below a certain pressure level. This pressure level varies between compressors, but high turbo-pressure increases the parasitic power absorption losses within the air compressor, thereby increasing the power absorption of the air compressor during cycles when the air compressor is unloaded and not compressing air.

Accordingly, the present invention permits use of the turbo-pressure air by the air compressor even though the output pressure of the turbocharger is greater than the inlet pressure limit for the compressor. The present invention comprises a compressor inlet pressure control device which maintains the pressure level at the inlet of the compressor at a predetermined pressure level less than the pressure level at the outlet of the turbo-charger whenever the pressure level at the output of the turbocharger exceeds the predetermined pressure level. Accordingly, the invention solves the prior art problem by retaining the advantages of using turbocharger air in the air compressor even though the output of the turbocharger is above the pressure limits of the compressor.

These and other advantages of the invention will become apparent in the ensuing description with reference to the accompanying drawings, in which.

Figure 1:
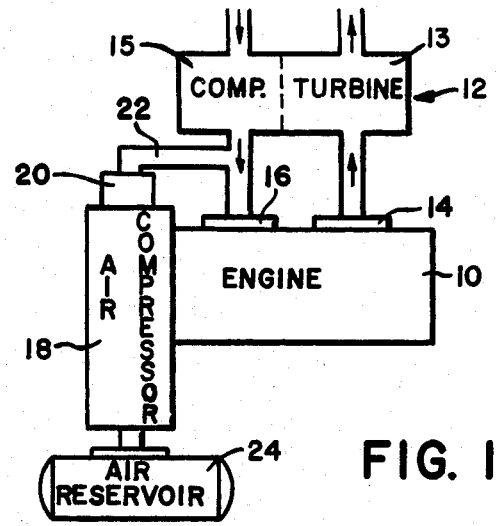
FIG. 1 is a schematic illustration of a turbocharger air supply system.

Referring now to the drawing, a conventional vehicle engine which may be, for example, a diesel engine used to power a heavy duty truck is generally indicated by the numeral 10. The engine 10 is equipped with a turbocharger illustrated diagramatically as at 12 which is connected to the exhaust manifold 14 of the engine 10 and to the intake manifold 16 of the engine 10. The turbocharger, as is well known to those skilled in the art, includes a turbine section 13 which is turned by the exhaust gasses from the exhaust manifold 14 in order to operate a compressor section 15 which compresses atmospheric air which charges the intake manifold 16 with compressed air such that the pressure level in the intake manifold 16 is above atmospheric pressure for most conditions of vehicle operation. The engine 10 is drivingly connected with a conventional automotive air compressor 18 which is driven by the engine through, for example, a direct gear drive or a belt drive. The air compressor is provided with pistons (not shown) which compress air which is communicated to the air compressor 18 through the inlet thereof. A valve mechanism 20 made pursuant to the teachings of the present invention controls communication between an air line 22 which is communicated to the intake manifold 16 and the inlet of the air compressor 18 so that the air undergoing compression in the air compressor 18 has already been compressed to a pressure level above atmospheric by the turbocharger 12 for most conditions of operation of vehicle engine 10. The outlet of the air compressor 18 is communicated to the air reservoir 24 which stores air to be used in, for example, the vehicle air brake system.

The valve 20 includes a housing 26 which defines a stepped bore 28 therewithin having a larger diameter section 30 and a smaller diameter section 32 with a shoulder 34 therebetween. A piston 36 has a larger diameter portion 38 which is slidably and sealingly engaged with the larger section 30 of the bore 28, a smaller diameter section 40 which is slidably and sealingly engaged with the smaller diameter portion 32 of the bore 28, a face 42 which is exposed to the pressure level in a pressure chamber 44 defined between the face 42 of the piston and the wall of the housing 26, and a shoulder 46 which faces the shoulder 34 to define a pressure cavity 48 therebetween which is vented to the atmosphere through a vent passage 50.

Housing 26 further includes an inlet port 52 which is communicated via the line 22 to the intake manifold 16, and an outlet port 54 which is communicated to the inlet of the air compressor 18. Both of the ports 52 and 54 communicate with a common chamber generally indicated by the numeral 56. The end of the piston 36 projects into the chamber 56. A circumferentially extending valve plate member 60 is carried on the end 58 of the piston 36 and moves with the piston 36 in the chamber 56. The valve plate 60 is adapted to sealingly engage a circumferentially extending valve seat 62 which circumscribes the inlet port 52. A spring 64 yieldably urges the valve plate 60 away from the valve seat 62 and, therefore also urges the piston 36 away from valve seat 62 to permit substantially uninhibited communication through the chamber 56 between the inlet port 52 and the outlet port 54. A passage 66 extends axially through the piston 36 to communicate the inlet port 52 with the pressure chamber 44 at all times, even when the valve plate 60 is engaged with the valve seat 62. A relief valve generally indicated by the numeral 68 includes a ball 70 yieldably urged into a sealing engagement with a seat 72 by a spring 74. The relief valve 68 controls the pressure in the outlet port 54, to prevent a malfunction of the valve 20 from causing the pressure level in the outlet port 54 to exceed a predetermined pressure level. When the pressure level at the outlet port 54 exceeds the predetermined level, the relief valve 68 opens to reduce the pressure level in the outlet port 54.

In operation, the turbocharger 12 charges the intake manifold 16 of the engine 10 to a pressure level which is generally higher than atmospheric pressure during operation of the engine 10. The pressure level in the intake manifold 16 is communicated through the pressure line 22 to the inlet port 52 of the valve 20. At relatively low pressure levels in the intake manifold 16, the various components of the valve 20 are in the positions illustrated in FIG. 2, thereby permitting substantially uninhibited fluid communication of the inlet port 52 to the outlet port 54. Operation of the air compressor 18 compresses the air communicated into the inlet port 52 to a still higher pressure level, which is used to charge the air reservoir 24.

Figure 2:
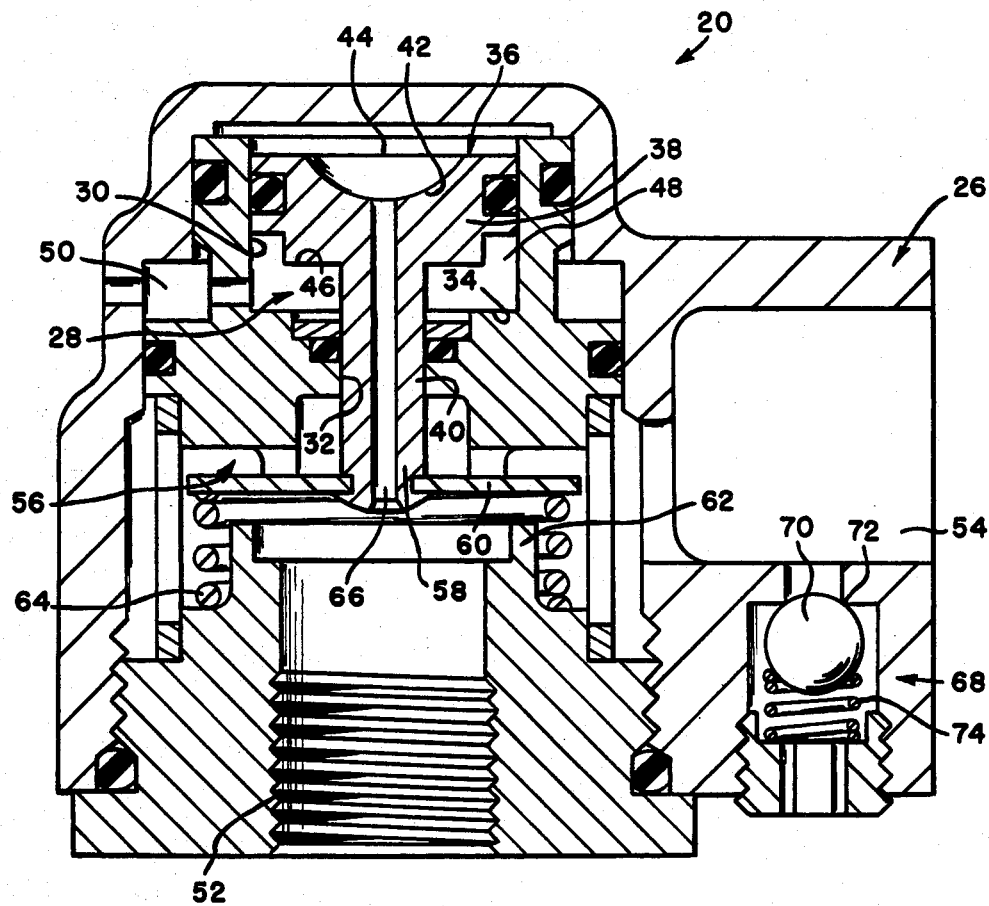
FIG. 2 is a cross-sectional view of the valve at the inlet of the air compressor which is made pursuant to the teachings of the present invention.

Since the passage 66 communicates the inlet port 52 with the pressure chamber 44 at all times, the pressure level communicated to the inlet port 52 will also be communicated to the pressure chamber 44. Because the chamber 48 is vented and thus remains at atmospheric pressure at all times, the effective area of the piston 36 exposed to the pressure level in chamber 44 is equal to the area of the shoulder 46 exposed to the pressure level in the vented chamber 48. Accordingly, when the force exerted on the piston 36 caused by the pressure in the chamber 44 acting on the effective area of the piston 36 which tends to move the piston 36 downwardly viewing FIG. 2 is greater than the upwardly acting force exerted on the piston 36 by the spring 64, the piston 36 moves the valve plate 60 into sealing engagement with the valve seat 62, thereby terminating fluid communication from the inlet port 52 to the outlet port 54. Of course, if the pressure level at the inlet port 52 is reduced, this reduced pressure level will be immediately communicated to the pressure chamber 44 through the passage 66. Accordingly, when the pressure level at the inlet port 52 drops below the predetermined pressure level, the spring 64 urges the piston 36 upwardly viewing FIG. 3, thereby moving the valve plate 60 away from the valve seat 62, thereby again permitting uninhibited fluid communication between the inlet port 52 and the outlet port 54 until the pressure level at the inlet port 52 again exceeds the predetermined pressure level.

As explained hereinabove, if the valve 20 malfunctions such that the valve remains open at high pressure levels, the safety valve 68 is set such that the pressure level at the outlet port 54 is vented when a predetermined high pressure level occurs to prevent damage to the compressor and to the valve.

We claim:

1. Compressor inlet control device for an air compressor powered by a vehicle engine having an intake manifold, a turbocharger operated by said engine to increase the pressure level in the intake manifold of said engine to pressure levels greater than atmospheric pressure, said turbocharger having an outlet communicated to said intake manifold, said air compressor having an inlet and an outlet, said air compressor inlet being communicated with the outlet of the turbocharger so that the air communicated into the inlet of the air compressor has been compressed by said turbocharger to a pressure level greater than atmospheric pressure and said air compressor raises the pressure level at the inlet of the air compressor to a still higher pressure level at the outlet thereof, said compressor inlet control device including means for controlling communication to the inlet of the compressor for maintaining the pressure at the inlet of the compressor at a pressure level less than the pressure level at the outlet of the turbocharger whenever the pressure level at the outlet of the turbocharger exceeds a predetermined level, said communication controlling means being a valve having a housing having an inlet connected to the outlet of the turbocharger, an outlet communicated to said inlet of the air compressor, and valve mechanism within said housing controlling communication between the inlet and outlet to establish said predetermined pressure level at the outlet of the housing whenever the pressure level at the inlet of the housing exceeds the predetermined level, said valve mechanism permitting substantially uninhibited communication between the inlet and the outlet of the housing when the pressure level at the inlet of the housing is less than the predetermined level, cooperating valve members in said housing controlling communication between the inlet of the housing and the outlet of the housing, and a pressure-responsive piston in said housing for operating said valve members in response to pressure variations at the inlet of the housing, said piston being a differential area piston having an effective area responsive to pressure for moving said piston between positions holding said valve members open and closing said valve members, spring means biasing said piston to said position holding said valve members open, and means for communicating the pressure level at the inlet of said housing to said effective area of the piston, said housing defining a stepped bore therewithin having larger and smaller diameter portions, said piston having larger and smaller diameter sections slidably received in the larger and smaller diameter portions of the bore, one side of said larger diameter section of the piston being communicated to atmosphere, said effective area of said piston being the difference between the larger and smaller sections of the piston, said pressure level communicating means being a fluid passage communicating said inlet of said housing with said other side of said larger section of the piston.

2. Compressor inlet control device as claimed in claim 1, wherein said cooperating valve members include a valve seal circumscribing the inlet of the housing and a valve plate operable by said piston to sealingly engage and then disengage from said valve seat in response to movement of the piston in said bore.

3. Compressor inlet control device as claimed in claim 1, wherein said cooperating valve members include a valve seat circumscribing said inlet and a valve plate operated by said piston and by the pressure differential between the outlet of the valve in the inlet of the valve when the force of said last-mentioned pressure differential exceeds the force exerted on the valve plate by said piston, said valve plate being responsive to the force exerted on the differential area of the piston when this last-mentioned force exceeds the force exerted on the valve plate by the pressure differential between the inlet of the valve and the outlet of the valve.

* * * * *